Aug. 25, 1959     H. C. MORTON     2,901,388
FRICTION FACING
Filed Nov. 19, 1956
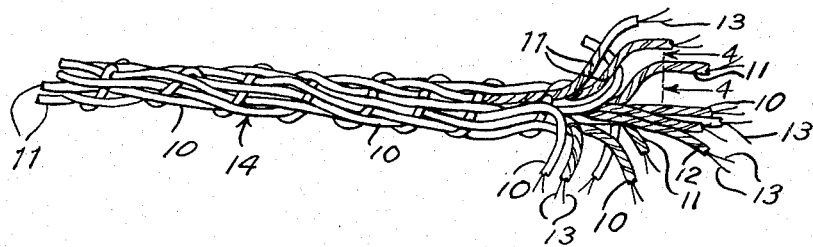
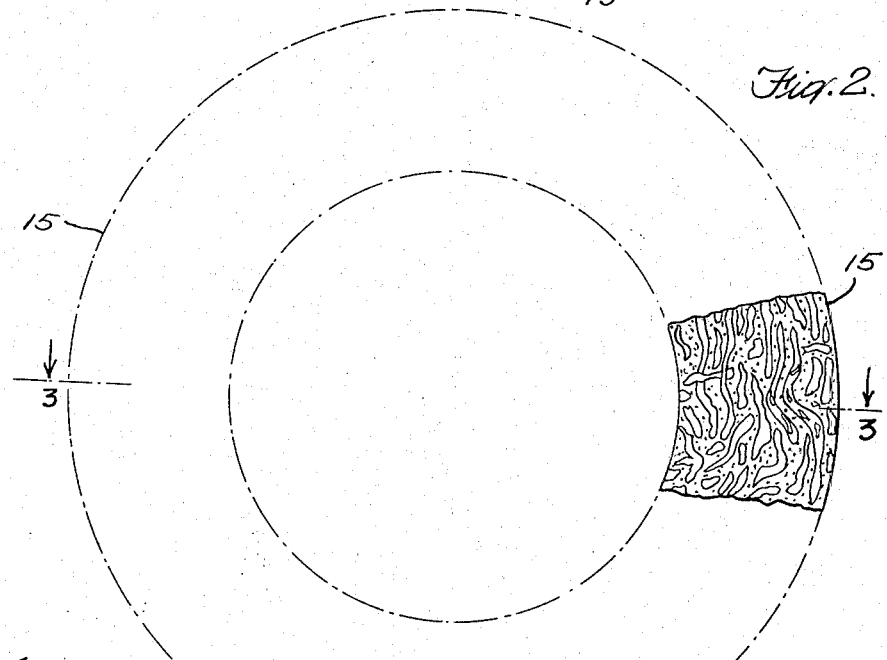
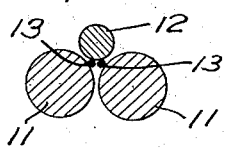
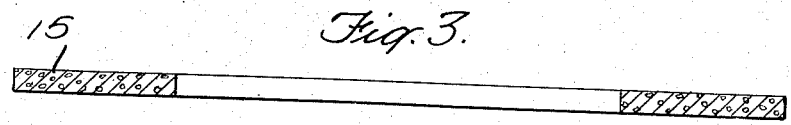
INVENTOR
HENRY C. MORTON
BY
ATTORNEY

United States Patent Office 2,901,388
Patented Aug. 25, 1959

2,901,388

FRICTION FACING

Henry Clifford Morton, Branford, Conn., assignor to The Russell Manufacturing Company, Middletown, Conn., a corporation of Connecticut Application November 19, 1956, Serial No. 622,880

4 Claims. (Cl. 154—52)

This invention relates to friction facings of the type used for clutch facings, brake liners and the like, and has for an object to provide a facing of the above type having novel and improved characteristics.

Another object is to provide a friction disk of the above type having improved friction and wear characteristics, high heat resistance and improved resistance to bursting due to centrifugal force.

Other objects and advantages will be apparent as the nature of the invention is more fully disclosed.

The invention relates in general to a friction disk of the type shown in Walters et al. Patent No. 2,676,125, dated April 20, 1954, which shows a friction disk formed from a spiral wound impregnated woven tape which is bonded under heat and pressure to produce a rigid disk having the characteristics required for use in automobile clutch facings. The tape is preferably woven somewhat loosely and is impregnated with a bonding agent which is hardenable under heat and pressure to produce the rigid structure required for the above purpose. The tape is disclosed in the Walters et al. patent as woven from spun asbestos yarn containing a limited proportion of cotton fibers to improve its spinnability.

A further object of this invention is to improve the characteristics of a disk of the above type by incorporating therein certain materials having high heat resistance, which retain their coefficient of friction at high temperature and have a high tensile strength.

In one embodiment this is accomplished by impregnating the tape with a friction compound containing synthetic fibers having the above properties, such as polyamides, terephthalates and acrylonitriles (nylon, Dacron, ethylene glycol ester of terephthalic acid polymer, and Orlon, acrylonitrile polymer). The fibers are preferably used in the form of flock which is uniformly dispersed in the impregnating compound. When the impregnant is set under heat and pressure the fibrous material is firmly bonded in the matrix.

After undergoing the finishing operations such as setting, grinding and drilling the disks are found to have the improved characteristics referred to above.

As the temperature increases due to surface friction the fibrous material softens to a tacky state which results in increased friction in contrast to conventional materials which lose friction rapidly as the temperature is increased. When the temperature again falls the fibers resume their original form and condition. Even after repeated heating and cooling during long use the disk retains its frictional characteristics without wear due to abrasion.

In a further embodiment rayon or nylon, Dacron or Orlon fibers may be mixed with the cotton and asbestos fibers from which the asbestos yarn is spun. In addition continuous filament nylon, Dacron or Orlon may be plied with the asbestos yarn to improve the resistance to rupture by centrifugal force, or wire strands can be plied with the asbestos yarn, and nylon, Dacron or Orlon fibers may be incorporated in the blend from which the asbestos yarn is spun.

The invention will be better understood by referring to the drawings in which:

Fig. 1 is a detail view of a woven asbestos web from which the facing is formed;

Fig. 2 is a plan view of a finished facing;

Fig. 3 is a section taken on the line 3—3 of Fig. 2; and

Fig. 4 is an enlarged section taken on the line 4—4 of Fig. 1.

Referring first to Fig. 1 the web is made from a plied yarn 10 having one or more plies 11 of spun yarn made from a mixture of asbestos fibers, cotton and synthetic fibers, plied with a continuous filament yarn 12 having high tensile strength and having the other characteristics required for making friction facings, and having one or more plies 13 of a metal wire such as copper. This yarn 10 is loosely woven into the form of a continuous web 14 which is then impregnated with a suitable bonding and friction compound as set forth in the above mentioned Walters et al. patent. The web 14 may be non-woven if desired, in which case it may be formed by a series of impregnated yarns bonded together by the bonding and friction compound.

The spun yarn 10 may be made from a blend of, for example, 70% asbestos fibers, 22½% cotton fibers and 7½% rayon fibers, and the continuous filament ply 12 may comprise nylon, Dacron or Orlon, or the like, which has a high tensile strength and light weight.

As another example the fiber blend may comprise 70% asbestos fibers, 15% cotton, 7½% rayon and 7½% nylon, Dacron or Orlon, and the continuous filament ply 12 may be made of either nylon, Dacron or Orlon, or copper wire.

The bonding and friction compound may consist of a resin or resinous material and may contain a suitable sizing and filler such as the synthetic fibers above mentioned, and may contain metal powder which is thoroughly dispersed therein.

The impregnated woven or non-woven tape after being spirally wound to form the disk and cured under high temperature and pressure as specified in said Walters et al. patent, forms a friction disk 15 which is characterized by improved frictional characteristics.

The synthetic fibers, whether in the fiber blend, in the continuous filament ply, or in the friction compound, provide the high temperature friction characteristics above mentioned. The continuous filament synthetic plies which have a high tensile strength and low specific gravity provide a high resistance to bursting by centrifugal force. Metal powder may be used in the friction compound to improve the heat transfer.

It is to be understood that the synthetic fibers may be omitted from the bonding compound or from the fiber blend if a sufficiently high heat resistance is provided by the synthetic ply in the plied yarn. The metal ply or plies 13 may be omitted if desired when metal powder is incorporated in the bonding compound or the metal powder may be omitted when the metal wires 13 are used.

The invention has been illustrated as applied to a friction disk for a clutch facing. It is also useful for making brake linings and other friction facings.

What is claimed is:

1. A friction facing, comprising a spiral wound web impregnated with a heat-set thermosetting bonding friction material, said web being composed of plied yarn some of said plies comprising spun yarn composed of a blend of asbestos, cotton and synthetic fibers, others of said plies comprising a continuous filament fiber, and thermoplastic synthetic fibers dispersed in said bonding material whereby under the action of increased temperature due to surface friction the thermoplastic fibers soften to a tacky state resulting in increased friction, and return to their original form and condition when the temperature falls.

2. A friction facing in accordance with claim 1, wherein the said synthetic fibers of the spun yarn and the said thermoplastic synthetic fibers in the bonding material are selected from the group consisting of fibers of nylon, ethylene glycol ester of terephthalic ester polymer and acrylonitrile polymer.

3. A friction facing in accordance with claim 1, wherein the thermoplastic synthetic fibers in the bonding material are in the form of flock.

4. A friction facing in accordance with claim 1, wherein the bonding material may also have dispersed therein powdered metal.

References Cited in the file of this patent

UNITED STATES PATENTS

| | | |
|---|---|---|
| 2,096,692 | Cilley | Oct. 19, 1937 |
| 2,196,570 | Walters | Apr. 9, 1940 |
| 2,584,825 | Walters et al. | Feb. 5, 1952 |

FOREIGN PATENTS

| | | |
|---|---|---|
| 737,365 | Great Britain | Sept. 21, 1955 |